April 7, 1936.　　　　　　　A. C. INCH　　　　　　　2,036,634
WATER TREATING APPARATUS
Filed Oct. 26, 1934　　　　　3 Sheets-Sheet 3
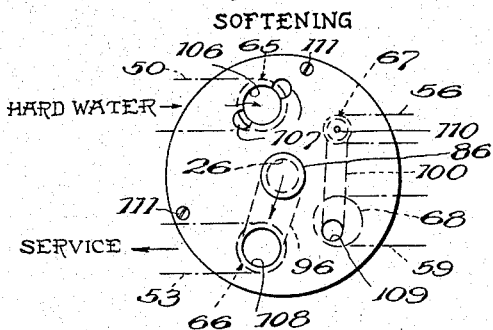
Fig. 9. SOFTENING
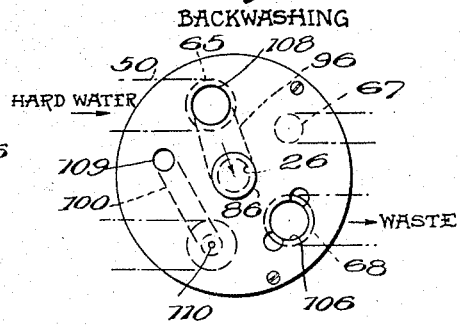
Fig. 12. BACKWASHING
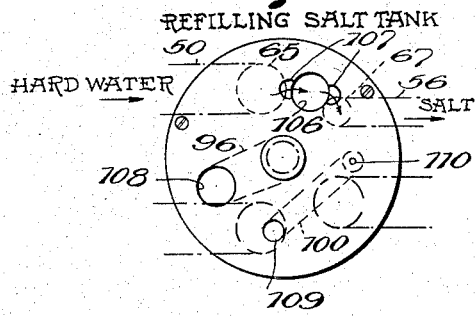
Fig. 10. REFILLING SALT TANK
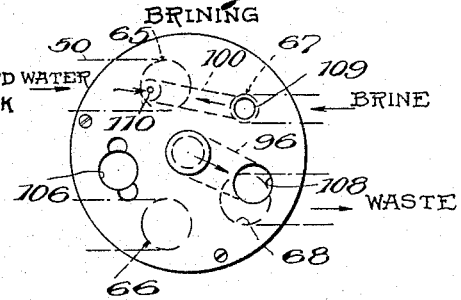
Fig. 13. BRINING
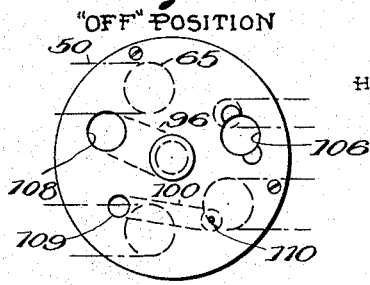
Fig. 11. "OFF" POSITION
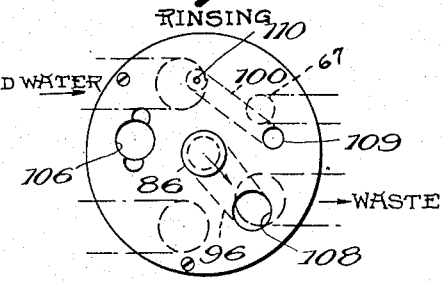
Fig. 14. RINSING
Inventor
Alexander Campbell Inch,
By K. P. McElroy
Attorney Patented Apr. 7, 1936

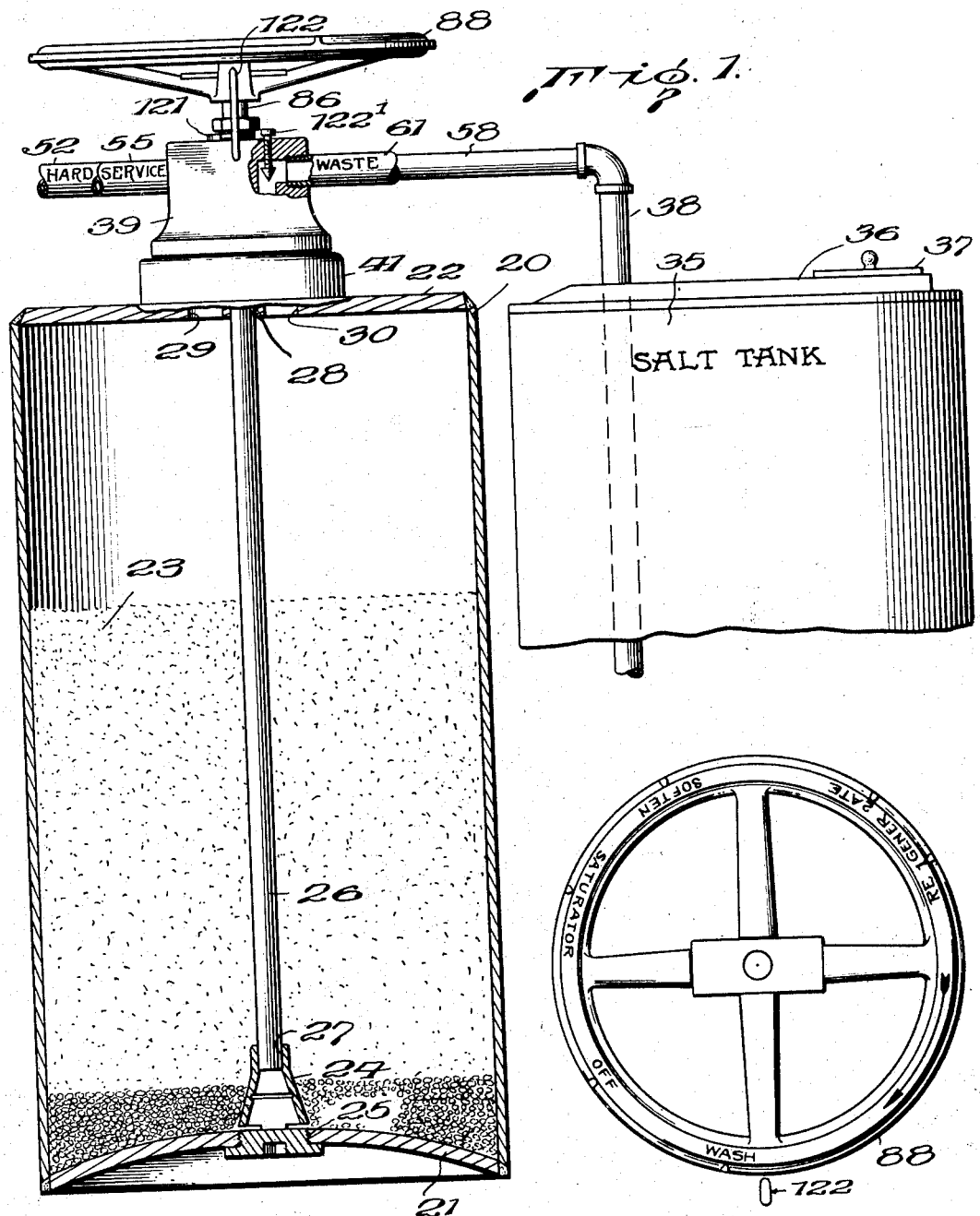

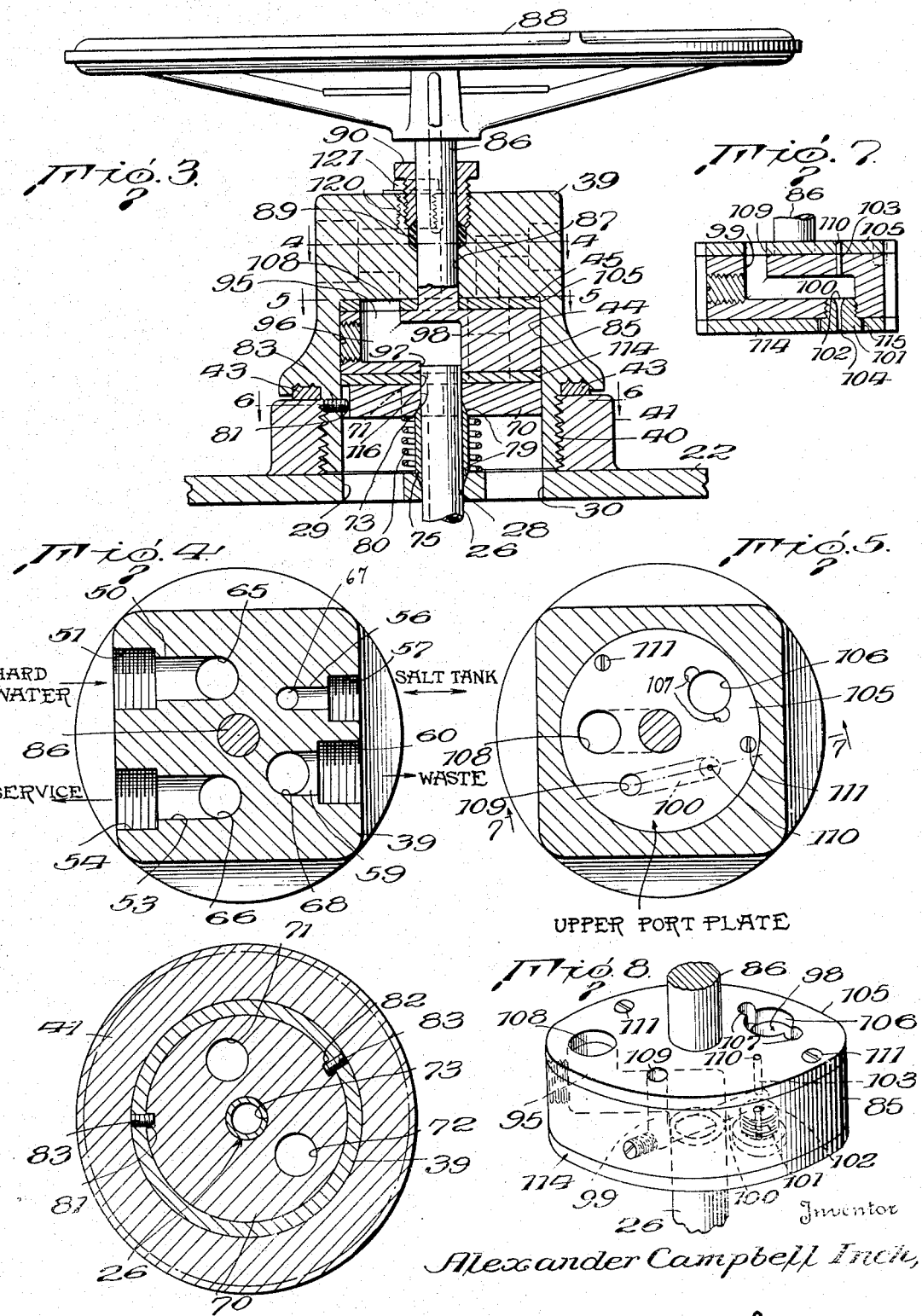

2,036,634

UNITED STATES PATENT OFFICE 2,036,634

WATER TREATING APPARATUS

Alexander Campbell Inch, Chiswick, London, England, assignor, by mesne assignments, to The Permutit Company (1934), Wilmington, Del., a corporation of Delaware Application October 26, 1934, Serial No. 750,211
In Great Britain November 2, 1933

8 Claims. (Cl. 210—24)

This invention relates to water treating apparatus; and it comprises more specifically water softening apparatus comprising a container for base exchange material (zeolites), a container for salt and brine and a multiport rotary valve mounted on the zeolite container and adapted to control flows of liquids to and from the zeolite container and the salt container, the valve having a ported stator housing with fluid connections to raw water, service and waste lines and to the salt container, a ported face-plate slidably mounted therein and fixed against rotation therein, the face-plate having connections to the bottom of the zeolite container and to the top thereof, and a ported discoid rotor between the stator housing and the plate and means for turning the rotor, the ports in the housing, the plate and the rotor cooperating in various angular positions of the rotor to direct flows to and from the zeolite container and the brine container, and means for applying resilient pressure to the face-plate to maintain water-tight contact between the rotor and the face-plate and housing; all as more fully hereinafter set forth and as claimed.

Water treating apparatus such as filters and water softeners in general require valve means for controlling flows of liquids through the apparatus, generally along at least two paths; namely along a path leading from a source of raw water through a bed of water treating material to a service line, and along a path from the source of liquid through the treating material and to waste. In base exchange water softening apparatus the valve means must control flows of liquids through other and additional paths; paths of liquids through the apparatus during backwashing, brining and rinsing.

The present invention, while applicable to filters and other types of water treating apparatus, is described with particular reference to base exchange water softening apparatus.

In downflow base exchange softeners, having a container for a bed of zeolites and a source of brine, during the softening operation hard water is caused to flow into the top of the zeolite container and from the bottom of the zeolite bed, to service. In backwashing, hard water is passed through the zeolite bed in a reverse direction and thence from the top of the softener to waste. In brining, brine is introduced into the softener as a slow, continuous flow. In rinsing, hard water is passed into the softener to displace and flush out to waste any brine remaining in the container.

The various flows are most conveniently controlled by means of a single multiway valve. This puts all the operations under a single control. The design of a practical multiway valve, however, presents many problems. It must not only be adapted to resist corrosive action by the brine but must also be leakproof in all positions at all times. Contamination of softened water by brine, for example, cannot be tolerated. The valve must be mechanically strong, simple, easy to operate and cheap to make. One general type of multiway valve for softening apparatus which has gone into considerable use makes use of a discoid rotor formed with ports and passages and a stator having a face provided with corresponding ports and passages and with fluid connections, the port arrangement being such that the rotor on being turned to various positions controls the connections between the various pipes leading to and from the apparatus. The discoid rotor has a single, flat, channeled or ported face which must be kept in water tight engagement with the corresponding stator face. The ports and passages are mostly arranged in these two opposed faces. This type of valve, while satisfactory if proper care is taken in design and construction, necessitates the provision of complicated passages and channels in both parts of the valve. Moreover, all fluid passages being in the same face of rotor and stator, interport leakage may occur in case the two elements are prevented, for some reason, from engaging in firm contact.

It is the achieved object of the present invention to provide, in a water treating apparatus, a multiway valve which has similar functions to those of the disc valve described, while being much less sensitive to variations in the manufacturing process and to variations in the contact pressure, and being more simple in design and construction.

In another of its aspects the invention comprises an improved water softening apparatus wherein the brine for regeneration is made up each time after the softening step is completed and during the backwashing operation; the brine being passed into the softener after conclusion of the backwashing step. The valve means is adapted to direct a flow of hard water into a tank containing solid salt, to make up the brine; and after the brine has been formed, to cause it to pass into the softener.

In the apparatus of the present invention the multiway valve comprises a discoid rotor formed with two flat, parallel faces provided with ports and passages, some of which extend through the disc, an enclosing stator housing having a flat face opposed to one of the rotor faces and having ports and passages in communication with the flat rotor face for various fluid flows, and a ported face-plate engaging the other rotor face and being in communication with the top and with the bottom of the zeolite container. Means are provided for pressing the face-plate, the rotor and the stator housing firmly together in water-tight contact, these means usually taking the form of a spring bearing on the face-plate. Advantageously, one or both of the rotor faces is provided with a ported plate of hard rubber or other resilient material to ensure water-tight contact in all operating positions. In the specific water softening apparatus embodiment described, the valve in one position makes connections for the softening stage, directing hard water downwardly through the softener and up from the bottom to service. In another position the valve is adapted to direct hard water into the salt tank where the hard water takes up a quantity of salt in solution forming a brine. In the next position, the valve controls the backwashing operation wherein hard water is directed upwardly through the softener and to waste. In the next position the valve, which contains injector means, draws brine from the salt tank with the aid of a flow of hard water, and injects the brine-water mixture into the softener. In the rinsing position the valve directs a flow of hard water through the softener to waste to allow the incoming water to displace the spent brine. The valve also has an "off" position wherein flow of hard water to the softener is cut off.

In the accompanying drawings I have shown, more or less diagrammatically, one form of specific embodiment of water softening apparatus within the invention. In the showings, Fig. 1 is a view partly in elevation and partly in vertical section of a complete water softening apparatus including the zeolite container, salt tank and multiway valve, Fig. 2 is a view of the valve wheel of the valve shown in Fig. 1, Fig. 3 is a detail view partly in vertical section and partly in elevation of the valve, including the stator housing, rotor and face-plate, Fig. 4 is a sectional view taken along line 4—4 of Fig. 3, Fig. 5 is a sectional view taken along line 5—5 of Fig. 3, Fig. 6 is a sectional view taken along line 6—6 of Fig. 3, Fig. 7 is a sectional view taken along line 7—7 of Fig. 5 and showing the rotor, Fig. 8 is an isometric view of the rotor and port plates, to show the arrangement of the ports and passages, and Figs. 9 to 14 are diagrammatic showings of the valve to illustrate the port connections for the several valve positions during the different stages of operation of the softener.

In the showings, in which like reference characters indicate like parts throughout, Fig. 1 shows a complete water softening apparatus within the invention, having a container 20 for zeolite provided with a bottom 21 and a top cover 22, both advantageously welded in place as shown. The container is filled with a body of zeolite 23. A strainer 24 is mounted in bottom 21 by means of threads 25 on the strainer, the bottom having a correspondingly threaded bore. A fluid conduit 26 attached to the strainer as at 27 extends upwardly and through a bore 28 in top cover 22. The top cover is provided with two additional bores 29 and 30, as shown. A salt tank 35 is provided with a cover member 36 having an opening with a removable lid 37 for allowing solid salt to be poured in. A conduit 38 extends through the cover 36 to the bottom of the salt tank, appropriate strainer means (not shown) being provided at the bottom. The salt tank is adapted to hold a charge of solid salt sufficient for a large number of regenerations. Brine for regeneration is made up each time before use, as described below.

Mounted on top cover 22 of the zeolite tank is a valve having a ported cast housing 39 having a threaded extension 40 firmly screwed into a correspondingly threaded collar 41 attached to cover 22 as by welding. A gasket 43 between the housing 39 and the collar insures a tight seal. The housing has an inner cylindrical bore 44 open at the bottom and ending at 45 in a flat face. The housing is provided with four fluid passages: a passage 50 advantageously threaded as at 51 to receive a hard water conduit 52, a passage 53 threaded as at 54 to receive a service conduit 55, a passage 56 threaded as at 57 to receive a conduit 58 leading to salt tank conduit 38, and a passage 59 threaded as at 60 to receive the end of a waste conduit 61. These passages deliver respectively to four ports 65, 66, 67 and 68 in flat face 45. Slidably and snugly fitting in bore 44 is a discoid face-plate 70 provided with two ports 71 and 72 extending through the plate and with a central bore 73 snugly receiving the upper end of conduit 26, as shown. The face-plate is free to slide with respect to conduit 26. A rubber sleeve 75 surrounding conduit 26 and in close contact with the face-plate and top cover 22 insures a tight joint between the face-plate and the conduit. The lower mouth of bore 73 and the upper mouth of bore 28 are flared conically as at 79 to receive the ends of the sleeve, as shown. A coil spring 80 is arranged to press the face-plate resiliently upward. The face-plate has vertical grooves or keyways 81 and 82, and two pins 83 screwed into the housing cooperate with the grooves to restrain rotation of the face-plate in bore 44 while allowing longitudinal motion.

The rotary part of the valve comprises a discoid rotor 85 fitting snugly in bore 44 and having an integral valve shaft 86 extending upwards through a bore 87 in the housing and having a hand wheel 88 attached to the top, for turning the rotor to the different operating positions. Packing 89 and packing gland nut 90 insure a tight seal between shaft 86 and the housing. The rotor has a port 95 in the upper face in communication through a transverse passage 96 with a bore 97 into which the end of conduit 26 fits. The rotor disc has a port 98 extending therethrough and a port opening 99 in the upper face in communication through a passage 100 with an injector element 101 screwed into the rotor as shown and having a fine Venturi opening 102. The injector element is provided with a slot 104 to allow it to be put in or removed with a screwdriver. A fine bore 103 extends from the upper face to the end of passage 100 opposite the injector Venturi bore.

On each flat face of the rotor is positioned a port plate advantageously of hard rubber or ebonite, to ensure water-tight contacts. The upper port plate 105 (Fig. 5) is provided with a bore 106 corresponding to rotor bore 98. Adjacent bore 106 and in communication therewith are two small arcuate extensions 107, for a purpose hereinafter described. This port plate has a bore 108 corresponding to rotor bore 95, a bore 109 corresponding to rotor bore 99, and a small bore 110 corresponding to rotor bore 103. The port plate is fixed to the rotor face by means of pins or screws 111 as shown. The lower port plate 114 is attached to the rotor similarly to port plate 105 and has a bore 115 surrounding the lower end of injector 101 and a bore 116 surrounding conduit 26. In case extreme simplicity is desired the port plates need not be provided, the rotor faces in this case being ported in a way similar to the port plates described.

The housing is provided with a threaded opening 120 located directly above hard water inlet bore 65 and provided with a removable threaded plug 121. Should the injector become stopped up, plug 121 can be removed and the rotor turned to a position where bores 103 and 102 are directly underneath opening 120, allowing a fine wire to be thrust in for cleaning these fine bores. The housing is also provided with a threaded, conical-ended plug 122, (see Fig. 1) the conical end extending into waste outlet passage 68, for regulating or throttling the waste outlet. Sometimes the pressure in the mains is so high that backwashing is undesirably violent unless throttling is provided for.

The apparatus can best be understood by considering its operation. Figs. 9 to 14 are diagrammatic plan views of the rotor and port plate, to illustrate the various valve positions. Fluid passages 50, 53, 56 and 59 in the stator housing are indicated in dotted lines.

In the softening stage the valve is turned to the position indicated in Fig. 9 by means of the hand wheel, the hand wheel being appropriately indexed as shown (Fig. 2), the indexes cooperating with a pointer 122 fixed to the housing. In the softening position, hard water flows in through conduit 52 and passage 50 to bore 65 and thence through passage 106 in the rotor port plate 105, rotor passage 98, face-plate port 71 and cover openings 29 and 30 to the top of the softener. Softened water passes through strainer 24 up through conduit 26 into rotor passage 96, rotor port 95 and port-plate port 108, to stator port 66 and thence through passage 53 into service conduit 55.

When the softening operation is completed, the zeolites being exhausted, the valve is turned to the position indicated in Fig. 10, the hand wheel being turned until the index mark "saturator" (Fig. 2) comes opposite pointer 122. In this position hard water is passed into the salt tank to take up salt and form a brine. Hard water enters through passage 50 and port 65 in the stator housing and thence through arcuate channels 107 and across port 106, and into stator port 67 and passage 56, into brine conduits 58 and 38. Hard water flows into the salt tank, filling it to a certain extent.

The valve is next turned to backwashing position, this position being shown in Fig. 12. The hard water which has been introduced into the salt tank is left therein to dissolve salt, during the time the backwashing operation is going on. In the backwashing position, hard water enters through stator passage 50 and port 65, rotor port 95 and passage 96, to the upper end of conduit 26. Waste backwashing water passes out of the container through cover openings 29 and 30, face-plate port 72, port-plate port 106 and waste outlet port 68 and passage 59 in the stator housing. The backwash flow is throttled to the desired degree by screw plug 122' (Fig. 1).

When backwashing is completed, the valve is turned to brining position (index mark "regenerate 1" on the hand wheel). This valve position is shown in Fig. 13. In this position hard water enters through passage 50 and port 65 in the stator housing and is directed down through port-plate bore 110, rotor bore 103 and through the bore 102 of the injector, through face-plate port 71 and into the softener. The injector draws brine through passage 100 and port 99 in the rotor, which lead through upper port plate port 109 and stator passages 67 and 56 and conduits 58 and 38, to the brine tank. The strong brine which has been formed in the salt tank is diluted in the injector by being mixed with hard water. Spent brine passes upwardly through conduit 26 and rotor passage 96 to the port 68 in the stator housing, whence it passes through passage 59 and conduit 61 to waste.

When the brining operation is completed, the valve is turned to rinse position (index mark "regenerate 2" on the hand wheel). In this position, shown in Fig. 14, port 109 is displaced from the brine conduit passage opening 67 in the stator, so that brine is no longer injected. Hard water continues to flow into the softener through the injector, in the manner described in connection with Fig. 13, and waste brine flows out to waste as described. At the end of the rinsing stage the valve is turned back to softening position for a new period of softening.

The softening apparatus can be shut off completely by turning the hand wheel to "off" position. This valve position is shown in Fig. 11. Port-plate port 108 is displaced from hard water inlet port 65, hence no hard water enters the softener.

What I claim is:

1. In water treating apparatus having a container for water-treating material, a multiway valve comprising a ported stator housing with connections for different flows of fluids, and having a flat inner face provided with ports in communication with the fluid connections, a ported face-plate slidably mounted in the housing opposed to the flat face and fixed against rotation, the face plate having fluid connections and ports in its face communicating therewith and a ported, flat faced discoid rotor between the stator face and the face-plate, the ports in the stator, the plate and the rotor cooperating in various angular positions of the rotor to direct different flows to and from the container and means for applying resilient pressure to the face-plate to maintain water-tight contact between the rotor and the face-plate and between the inner face of the housing.

2. The apparatus of claim 1 wherein port plates are provided between the rotor and the housing and between the rotor and the face-plate, the port plates being of resilient material to insure a tight contact.

3. In water treating apparatus a container for water treating material and a multiway valve mounted thereon, the valve comprising a ported stator housing with connections for fluid flows, a ported face-plate slidably mounted therein and fixed against rotation therein, the face-plate having fluid connections with the top and with the bottom of the container, a flat, ported discoid rotor between the stator housing and the face plate, the ports in the housing, the plate and the rotor cooperating in various angular positions of the rotor to direct flows to and from the container and means for applying resilient pressure to the face-plate to maintain water tight contact between the rotor, the face-plate and the housing.

4. In water softening apparatus a multiway valve comprising a stator housing having a cylindrical chamber therein, one end of the chamber being flat faced and having ports in communication with conduits for various liquids including hard water and brine, a flat discoid face-plate slidably fitting in said chamber, means for preventing rotation of the face-plate in the chamber, a flat faced, discoid ported rotor snugly fitting in said chamber between the stator face and the face-plate, the ports in the rotor registering with ports in the stator flat face in some angular positions of the rotor, the face-plate having ports therein adapted to register with ports in the rotor in certain angular positions of the rotor, the rotor having an internal transverse passage in communication with one face through a port and having an injector in communication therewith in the opposite face and a second port in communication with the first face and opposite the injector, whereby when the rotor is in position such that hard water enters through the second port, brine is drawn through the first port and is injected into the softener.

5. The apparatus of claim 3 wherein a conduit is positioned in the container extending from a point near the bottom, to the face-plate and rotor, the face-plate and the lower face of the rotor being centrally bored to receive the upper end of the conduit, the rotor having a passage leading from the upper end of the conduit to a port located eccentrically in the upper face of the rotor and having a second passage eccentrically located in the rotor and extending therethrough and ending in a second port in the rotor face, and the stator housing is provided with an inlet port for hard water, an outlet port to service and an outlet port to waste, the housing ports being eccentrically located and so arranged that in one rotor position the first eccentric rotor port in communication with the conduit is in registry with the service outlet port and the second rotor passage is in registry with the hard water inlet port, whereby hard water is passed into the container and from the bottom thereof up through the conduit and out at the top, and in another rotor position the eccentric rotor port in communication with the conduit is in registry with the hard water inlet port and the port for the second eccentric passage is in registry with the waste outlet port, to direct a flow of hard water through the container in a reverse direction.

6. In water treating apparatus, a multiway valve comprising a ported stator housing with connections for different flows of different fluids and having a flat inner face provided with ports in communication with the fluid connections and a cylindrical bore extending below the ported face, a discoid rotor in the cylindrical bore below the ported face and having ports and passages therein communicating with ports in the face, means for rotating the rotor, and a face plate in the bore below the rotor, slidable in the direction of the axis of the bore and fixed against rotation in the bore and having ports adapted to register with rotor ports in certain positions of the rotor and means for resiliently forcing the face plate against the rotor to maintain water tight contact between the rotor and the face plate and between the rotor and the inner face of the housing.

7. In water treating apparatus having a container for water treating material, a multiway valve comprising a ported stator housing with connections for different flows of fluids and having a flat inner face provided with ports communicating with said connections, a ported rotor opposed to and in contact with the ported face, a face plate below the rotor, slidable in the direction of the axis of the bore and fixed against rotation in the bore and having ports communicating with the rotor ports and a central bore, a conduit extending into said central bore and extending down into the container and means for pressing the face plate upward against the rotor, the face plate sliding with respect to the conduit.

8. A valve for water treating apparatus handling different flows of different fluids and adapted to positively prevent intercontamination among the different fluids, said valve comprising a ported stator member having connections for the different fluids, a ported rotor cooperating with the stator and having channels extending therethrough and a non-rotating face plate abutting the rotor, slidable in the direction of the axis of the rotor and having ports communicating with the rotor channels, a conduit connection to the face plate and means for pressing the face plate against the rotor.

ALEXANDER CAMPBELL INCH.